United States Patent
Kamio (10) Patent No.: US 7,661,414 B2
(45) Date of Patent: Feb. 16, 2010

(54) INTERNAL COMBUSTION ENGINE SYSTEM

(75) Inventor: Junichi Kamio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 11/976,833

(22) Filed: Oct. 29, 2007

(65) Prior Publication Data

US 2008/0098985 A1 May 1, 2008

(30) Foreign Application Priority Data

Oct. 30, 2006 (JP) ............................. 2006-294065

(51) Int. Cl.
  *F02B 43/00* (2006.01)
  *F02G 5/00* (2006.01)
(52) U.S. Cl. .......................................... 123/557; 123/3
(58) Field of Classification Search ................. 123/1 A, 123/3, 25 B, 25 D, 25 F, 295, 431, 443, 436, 123/492, 536, 556, 557, 575, 577
See application file for complete search history.

(56) References Cited

U.S. PATENT DOCUMENTS

| | | | | |
|---|---|---|---|---|
| 4,210,103 A | * | 7/1980 | Dimitroff et al. | ............ 123/1 A |
| 4,385,593 A | * | 5/1983 | Brooks | ........................ 123/1 A |
| 7,290,505 B2 | * | 11/2007 | Kamio et al. | ................ 123/1 A |
| 7,406,947 B2 | * | 8/2008 | Lewis et al. | .................. 123/478 |
| 7,412,966 B2 | * | 8/2008 | Lewis et al. | .................. 123/431 |
| 7,461,628 B2 | * | 12/2008 | Blumberg et al. | ........... 123/304 |
| 2004/0250790 A1 | * | 12/2004 | Heywood et al. | ........... 123/300 |
| 2007/0163537 A1 | * | 7/2007 | Kamio et al. | ................ 123/304 |
| 2007/0204813 A1 | * | 9/2007 | Arai et al. | .................. 123/25 A |
| 2007/0221163 A1 | * | 9/2007 | Kamio | ....................... 123/25 B |
| 2008/0010993 A1 | * | 1/2008 | Morgenstern | ................ 60/780 |
| 2008/0282998 A1 | * | 11/2008 | Kuzuoka et al. | ................ 123/3 |

FOREIGN PATENT DOCUMENTS

| | | | |
|---|---|---|---|
| JP | 58-96155 A | | 6/1983 |
| JP | 2001-152919 A | | 6/2001 |
| JP | 2002-130006 A | | 5/2002 |
| JP | 2008-19848 | * | 1/2008 |
| JP | 2008-38739 | * | 2/2008 |

* cited by examiner

*Primary Examiner*—Hai H Huynh
(74) *Attorney, Agent, or Firm*—Birch, Stewart, Kolasch & Birch, LLP (57) ABSTRACT

An internal combustion engine system includes a fuel tank containing ethanol, a fuel tank containing at least one of gasoline and GTL naphtha, a reforming device for reforming ethanol to obtain diethyl ether, a heat exchange device for heating a heating medium, an ethanol heater for heating ethanol, and a fuel supply controlling device for controlling a mixture ratio of the fuel. The internal combustion engine system further includes an intake air heater for heating intake air with the heating medium. The internal combustion engine system includes an adiabatic storage container for storing the heating medium during a halt of an internal combustion engine. A flow controlling device is provided for supplying the heating medium to the adiabatic storage container only when a temperature detected by a thermal detector is higher than a temperature detected by a thermal detector during an operation of the internal combustion engine.

18 Claims, 5 Drawing Sheets

INTERNAL COMBUSTION ENGINE SYSTEM

BACKGROUND OF THE INVENTION

1. Field of the Invention

The present invention relates to an internal combustion engine system switchable between a spark ignition operation and a homogeneous charge compression ignition operation.

2. Description of the Related Art

In recent years, in order to improve fuel efficiency and reduce emission matters in internal combustion engines, compression ignition internal combustion engines represented by homogeneous charge compression ignition internal combustion engines have been under review. In a homogeneous charge compression ignition internal combustion engine, oxygen containing gas and a compression ignition fuel are introduced into a cylinder and compressed to ignite spontaneously.

However, as distinct from spark ignition internal combustion engines, homogeneous charge compression ignition internal combustion engines have problems that it is difficult to control ignition timing and the engines can be operated safely only in a narrow operating range. More specifically, the problems mean that use of a fuel with high ignitability tends to cause knocking when required load of the engine is high, and that use of a fuel with low ignitability tends to cause misfire when required load of the engine is low. In order to overcome the problems, there is known an internal combustion engine system switchable between a spark ignition operation and a homogeneous charge compression ignition operation depending on operation conditions or the like (for example, see Japanese Patent Laid-Open No. 2001-152919, and No. 2002-130006.)

Furthermore, in order to overcome the problems, it is conceivable that two or more types of fuels having different ignition characteristics are prepared, and the mixture ratio of the fuels is controlled when the fuels are provided to the homogeneous charge compression ignition internal combustion engine, thereby controlling the ignition timing. Examples of the two or more types of fuels having different ignition characteristics may include a combination of liquid hydrocarbon such as gasoline or GTL naphtha and ethanol.

Use of ethanol allows the so-called "carbon neutral effect", thereby contributing to carbon dioxide emission reductions. The carbon neutral effect means that combustion of ethanol derived from plants emits carbon dioxide but the net carbon emissions are zero because the material plants absorb carbon dioxide by carrying out photosynthesis in their growth processes.

The liquid hydrocarbon and the ethanol may be contained in separate tanks. Alternatively, the liquid hydrocarbon and the ethanol may be contained as a mixed fuel in a single tank and separated into the liquid hydrocarbon and the ethanol as necessary. It is known that addition of water to the mixed fuel of liquid hydrocarbon and ethanol easily separates the fuel into the liquid hydrocarbon and an ethanol-water mixture (for example, see Japanese Patent Laid-Open No. 58-96155).

When the liquid hydrocarbon is compared to ethanol, ethanol is less self ignitable than the liquid hydrocarbon. Therefore, a mixture ratio of the ethanol and the liquid hydrocarbon is adjusted, thereby changing ignition characteristics, for example, represented by the octane number. As a result, the ignition timing of a homogeneous charge compression ignition can be controlled.

However, there is demanded development of an internal combustion engine system in which the ignition timing of a homogeneous charge compression ignition can be controlled more effectively.

SUMMARY OF THE INVENTION

In order to overcome the problems, an object of the present invention is to provide an internal combustion engine system switchable between a spark ignition operation and a homogeneous charge compression ignition operation in which the ignition timing of a homogeneous charge compression ignition can be controlled precisely during the homogeneous charge compression ignition operation.

In order to achieve the object, a first aspect of the internal combustion engine system according to the present invention is an internal combustion engine system switchable between a spark ignition operation and a homogeneous charge compression ignition operation, comprising: a first fuel tank containing ethanol; a second fuel tank containing at least one of gasoline and GTL naphtha; a reforming means for reforming a portion of ethanol provided from the first fuel tank to an internal combustion engine by heating and bringing the ethanol into contact with a catalyst to obtain diethyl ether; a heat exchange means for exchanging heat between exhaust heat of the internal combustion engine and a heating medium to heat the heating medium; an ethanol heating means for heating ethanol provided to the reforming means with the heating medium heated by the heat exchange means; and a fuel supply controlling means for controlling a mixture ratio of ethanol provided from the first fuel tank to the internal combustion engine, at least one of gasoline and GTL naphtha provided from the second fuel tank to the internal combustion engine, and diethyl ether provided from the reforming means to the internal combustion engine.

According to the first aspect of the internal combustion engine system, a portion of ethanol contained in the first fuel tank can be reformed to diethyl ether with the reforming means. The ethanol has a lower self ignitability than the gasoline and GTL naphtha whereas the diethyl ether has a higher self ignitability than the gasoline and GTL naphtha.

Therefore, by controlling a mixture ratio of the ethanol, at least one of gasoline and GTL naphtha, and the diethyl ether provided to the internal combustion engine with the fuel supply controlling means, the ignition timing of a homogeneous charge compression ignition can be controlled precisely.

By the way, when the ethanol is reformed to the diethyl ether by using a catalyst, it is necessary to keep the temperature of ethanol brought into contact with the catalyst to be a constant temperature of about 200° C. For this purpose, it is conceivable that exhaust heat of the internal combustion engine can be used as a heat source for heating the ethanol up to the temperature. However, it is difficult to maintain desired reforming properties by direct use of exhaust heat of the internal combustion engine, because large heat radiation causes ununiform temperatures of the reforming means and ethanol has a large latent heat.

Therefore, in the first aspect of the internal combustion engine system, heat is exchanged between exhaust heat of the internal combustion engine and a heating medium by using the heat exchange means to heat the heating medium, and the heating medium is used to heat the ethanol with the ethanol heating means. As a result, the temperature of the ethanol can be easily kept at a constant temperature of about 200° C. The ethanol is brought into contact with the catalyst in the reforming means, thereby easily maintaining desired reforming properties.

Next, a second aspect of the internal combustion engine system according to the present invention is an internal combustion engine system switchable between a spark ignition operation and a homogeneous charge compression ignition operation, comprising: a first fuel tank containing ethanol; a second fuel tank containing at least one of gasoline and GTL naphtha; a reforming means for reforming a portion of ethanol provided from the first fuel tank to an internal combustion engine by heating and bringing the ethanol into contact with a catalyst to obtain diethyl ether; a heat exchange means for exchanging heat between exhaust heat of the internal combustion engine and a heating medium to heat the heating medium; an intake air heating means for heating intake air of the internal combustion engine with the heating medium heated by the heat exchange means; and a fuel supply controlling means for controlling a mixture ratio of ethanol provided from the first fuel tank to the internal combustion engine, at least one of gasoline and GTL naphtha provided from the second fuel tank to the internal combustion engine, and diethyl ether provided from the reforming means to the internal combustion engine.

According to the second aspect of the internal combustion engine system, as with the first aspect, by controlling a mixture ratio of the ethanol, at least one of gasoline and GTL naphtha, and the diethyl ether provided to the internal combustion engine with the fuel supply controlling means, the ignition timing of a homogeneous charge compression ignition can be controlled precisely.

In this case, the ignition timing can also be controlled by heating intake air of the internal combustion engine. Therefore, in the second aspect of the internal combustion engine system, heat is exchanged between exhaust heat of the internal combustion engine and a heating medium by using the heat exchange means to heat the heating medium, and the heating medium is used to heat intake air of the internal combustion engine with the intake air heating means.

As a result, the control of the ignition timing by the function of the fuel supply controlling means can be complemented by the heating of intake air with the intake air heating means, thereby controlling the ignition timing precisely and effectively.

The second aspect of the internal combustion engine system may further comprise an ethanol heating means for heating ethanol provided to the reforming means with the heating medium heated by the heat exchange means. As a result, the control of the ignition timing by the function of the fuel supply controlling means can be complemented by the heating of intake air in the intake air heating means, and also desired reforming properties can be maintained easily with the reforming means.

Note that equipping of the ethanol heating means in the second aspect of the internal combustion engine system has the same meaning as equipping of the intake air heating means in the first aspect of the internal combustion engine system.

In addition, both of the first and second aspects may comprise a fuel tank containing a mixed fuel comprising ethanol and at least one of gasoline and GTL naphtha; and a separating means for separating the mixed fuel provided from the fuel tank into at least one of gasoline and GTL naphtha and an ethanol-water mixture by adding water to the mixed fuel; instead of a first fuel tank containing ethanol and a second fuel tank containing at least one of gasoline and GTL naphtha.

In this case, as with the first and second aspects, a portion of the ethanol-water mixture obtained in the separating means is reformed to a diethyl ether-water mixture with the reforming means. After that, a mixture ratio of the ethanol-water mixture, at least one of gasoline and GTL naphtha, and the diethyl ether-water mixture to be provided to the internal combustion engine is controlled with the fuel supply controlling means. In the case that the internal combustion engine system comprises the ethanol heating means, heat is exchanged between exhaust heat of the internal combustion engine and a heating medium by using the heat exchange means to heat the heating medium, and the heating medium is used to heat the ethanol-water mixture with the ethanol heating means.

In each aspect of the internal combustion engine system, the spark ignition operation is carried out during high engine load conditions, while the homogeneous charge compression ignition operation is carried out during low engine load conditions.

In each aspect of the internal combustion engine system, when the internal combustion engine halts, the heating medium is cooled. As a result, when the internal combustion engine resumes, the heating medium is heated again from the cooled state. Therefore, it takes time until the ethanol, the ethanol-water mixture, or intake air of the internal combustion engine can be heated.

For this reason, each aspect of the internal combustion engine system preferably comprises an adiabatic storage container for containing the heating medium heated by the heat exchange means and storing the heating medium under adiabatic conditions during a halt of the internal combustion engine. In this each aspect of the internal combustion engine system, the heating medium is housed in the adiabatic storage container on the halt of the internal combustion engine and the heating medium is stored therein during the halt of the internal combustion engine, thereby preventing the heating medium from cooling. As a result, when the internal combustion engine resumes, the ethanol, the ethanol-water mixture, or intake air of the internal combustion engine can be heated at once.

Examples of the adiabatic storage container may include a heat storage container for storing cooling water heated by a water cooled internal combustion engine for the purpose of rapid warming up (see Japanese Patent Laid-Open No. 2001-207845).

When each aspect of the internal combustion engine system comprises the adiabatic storage container, the system preferably further comprises a first thermal detecting means for detecting a temperature of the adiabatic storage container; a second thermal detecting means for detecting a temperature of the heating medium heated by the heat exchange means; and a flow controlling means for flowing the heating medium to the adiabatic storage container only when the temperature detected by the first thermal detecting means is higher than the temperature detected by the second thermal detecting means during an operation of the internal combustion engine.

The flow controlling means flows the heating medium to the adiabatic storage container only when the temperature detected by the first thermal detecting means is higher than the temperature detected by the second thermal detecting means during an operation of the internal combustion engine. As a result, the heating medium is heated by the heat exchange means and also by the adiabatic storage container, thereby extending the range of temperature control during an operation of the internal combustion engine.

DETAILED DESCRIPTION OF THE PREFERRED EMBODIMENTS

Figure 1:
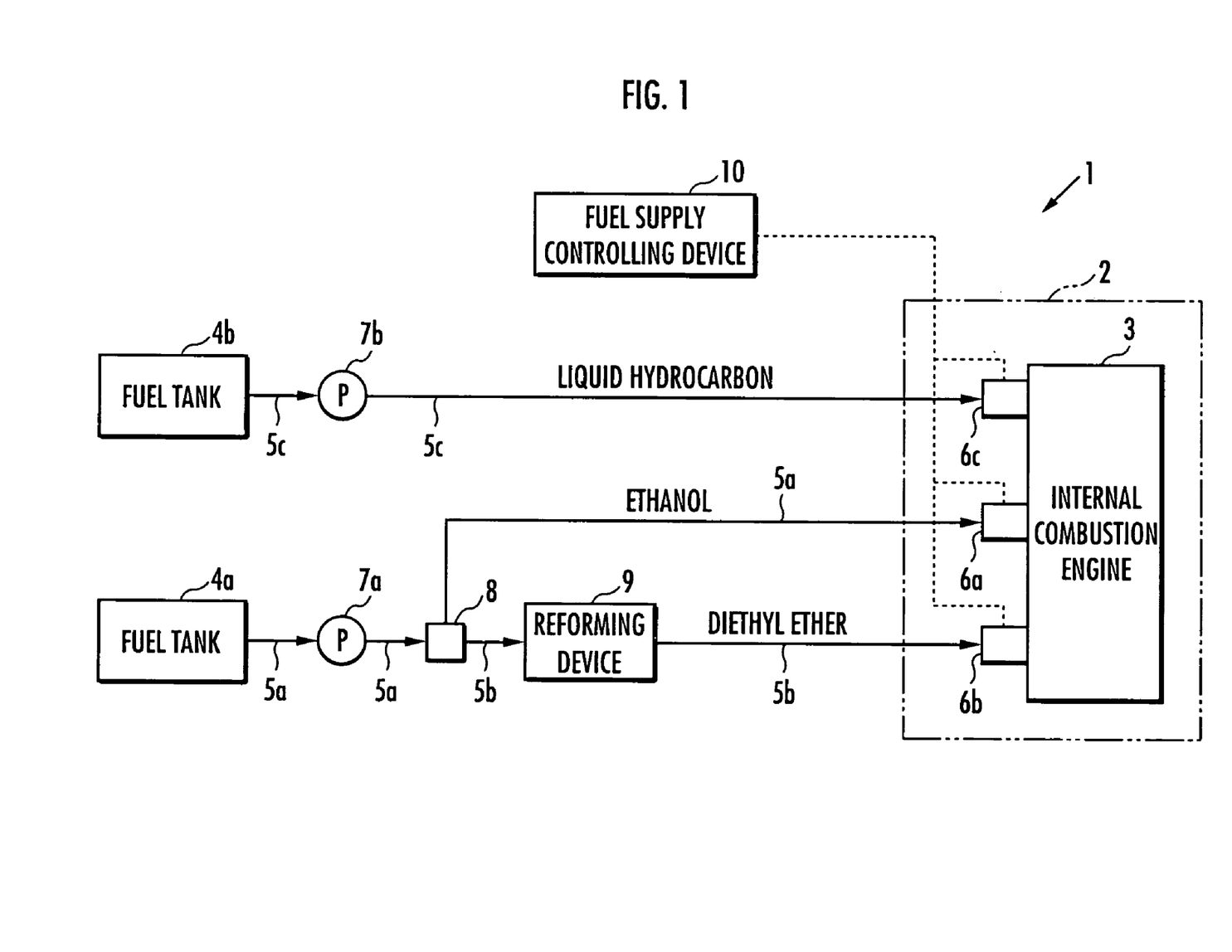
FIG. 1 is a system configuration diagram showing a configuration example of the internal combustion engine system according to the present invention.
Figure 2:
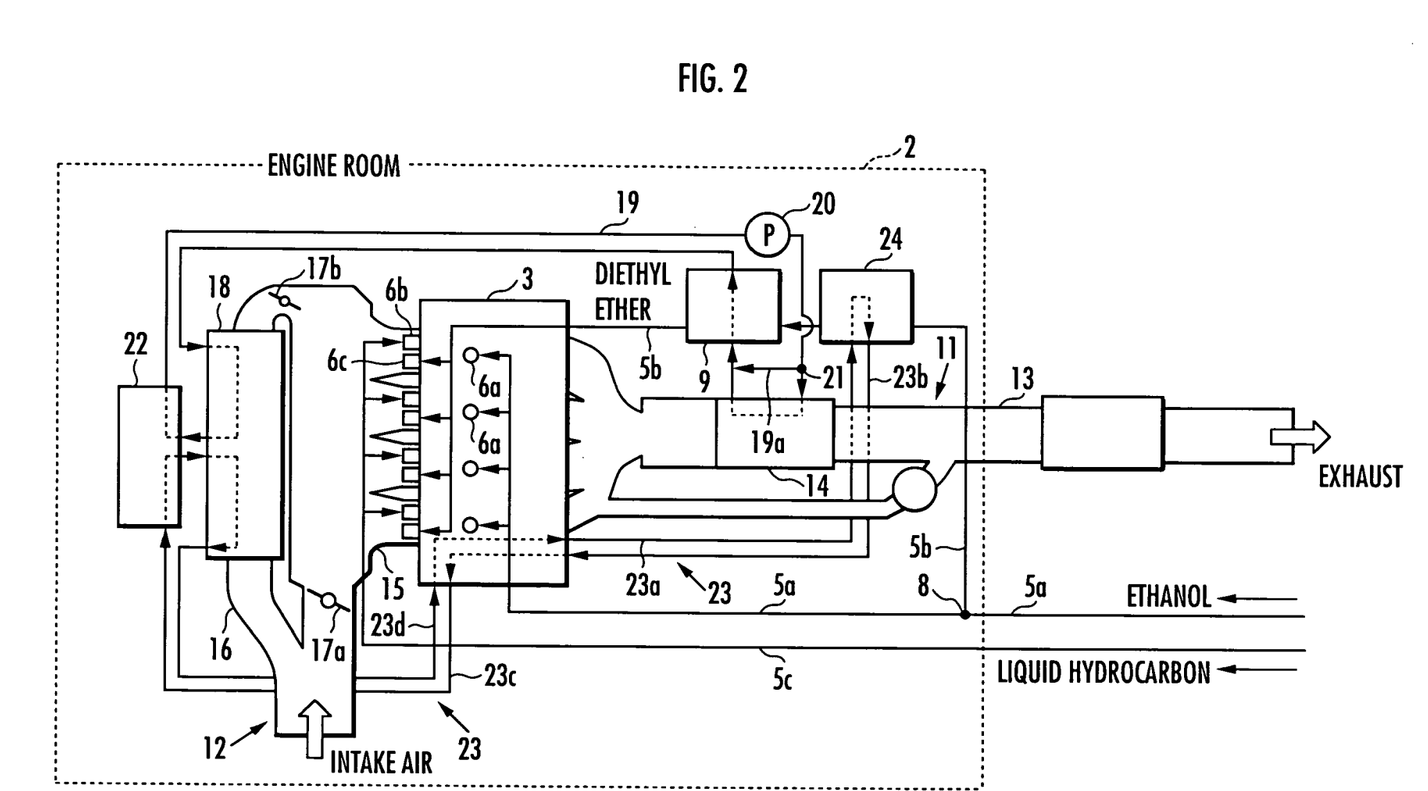
FIG. 2 is a system configuration diagram showing a configuration of an engine room in the internal combustion engine system of FIG. 1.
Figure 3:
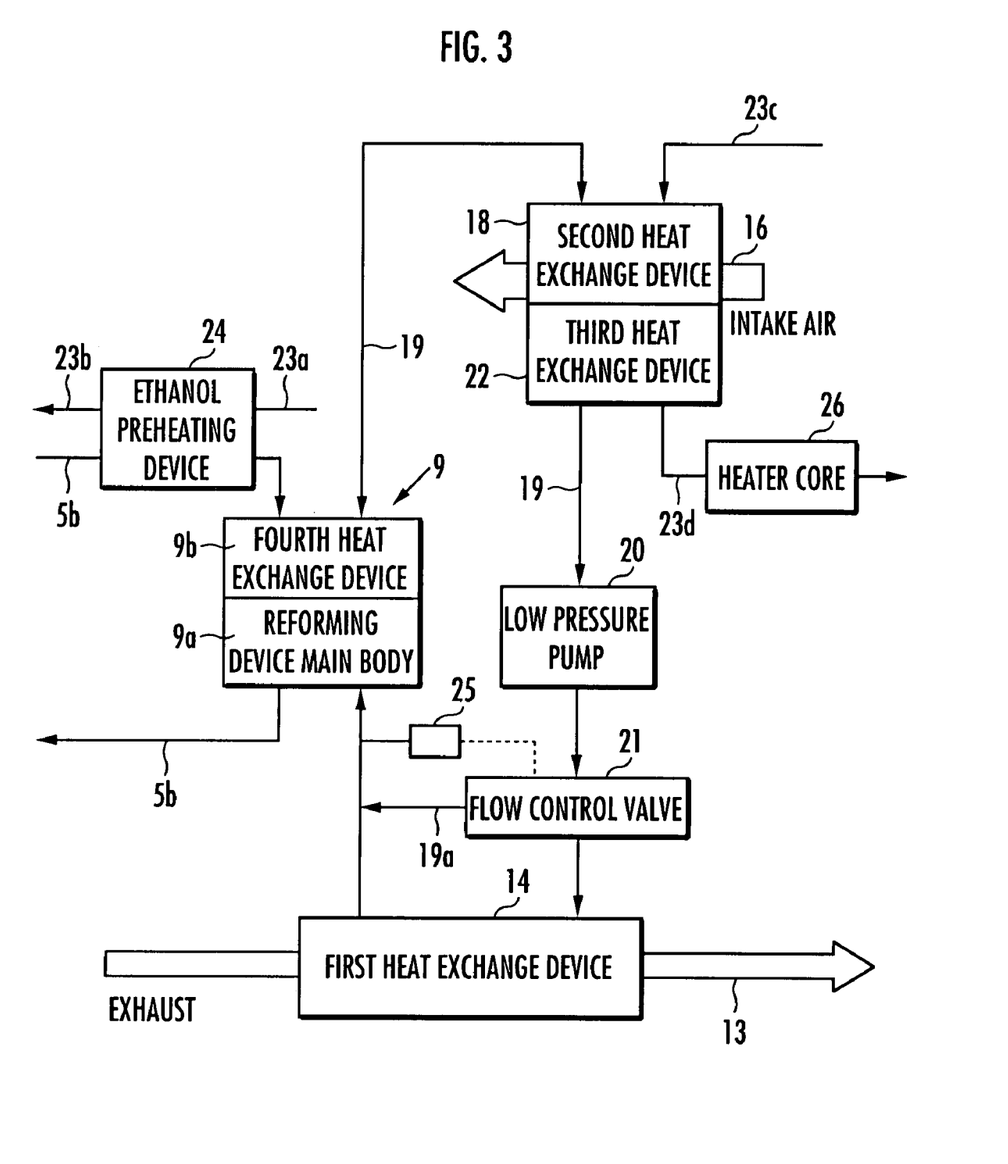
FIG. 3 is a function explanatory view of an embodiment of functions of a heating medium in the system of FIG. 2.
Figure 4:
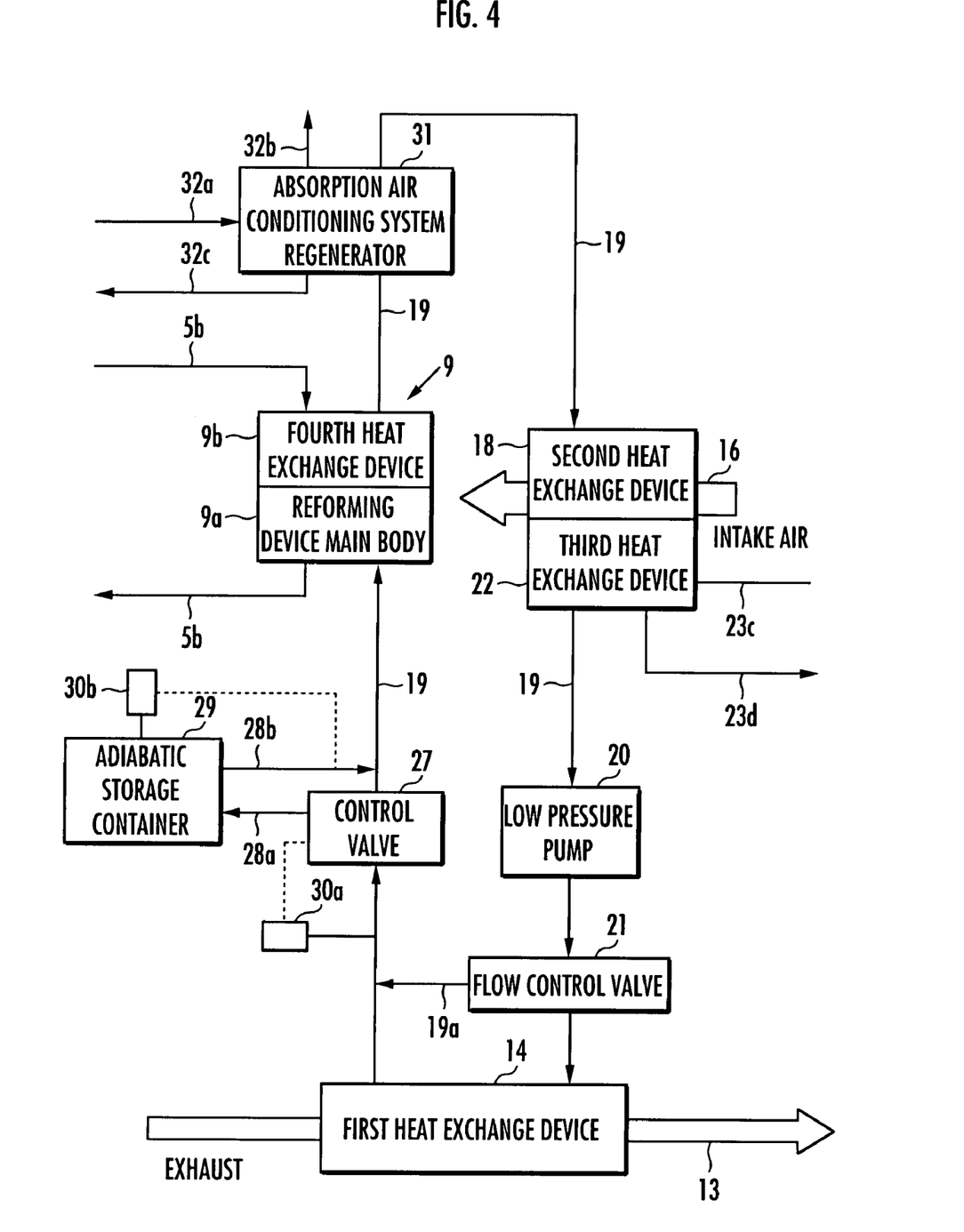
FIG. 4 is a function explanatory view of another embodiment of functions of a heating medium in the system of FIG. 2.
Figure 5:
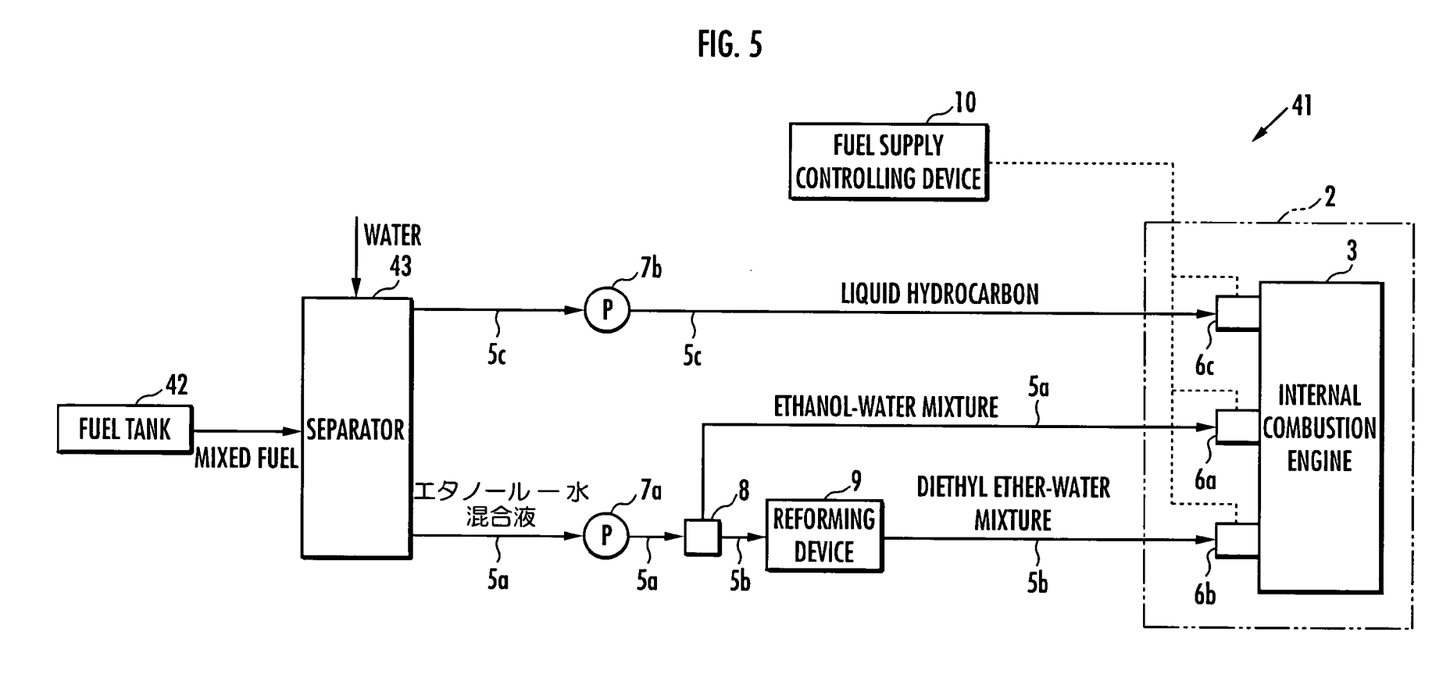
FIG. 5 is a system configuration diagram showing another configuration example of the internal combustion engine system according to the present invention.

Hereinafter, embodiments of the present invention will be described in further detail with reference to the attached drawings. FIG. 1 is a system configuration diagram showing a configuration example of the internal combustion engine system according to the present invention. FIG. 2 is a system configuration diagram showing a configuration of an engine room in the internal combustion engine system of FIG. 1. FIGS. 3 and 4 are function explanatory views of functions of a heating medium in the system of FIG. 2. FIG. 5 is a system configuration diagram showing another configuration example of the internal combustion engine system according to the present invention.

As shown in FIG. 1, an internal combustion engine system 1 according to the present embodiment comprises an internal combustion engine 3 installed in an engine room 2, a first fuel tank 4a and a second fuel tank 4b that provide fuels to the internal combustion engine 3. The internal combustion engine 3 is a hybrid combustion engine switchable between a spark ignition operation and a homogeneous charge compression ignition operation. The engine 3 is a flexible fuel vehicle that can be operated with fuels of ethanol and at least one of gasoline and GTL naphtha in an arbitrary mixture ratio. The first fuel tank 4a contains ethanol as a fuel to be provided to the internal combustion engine 3. The second fuel tank 4b contains gasoline or GTL naphtha as a fuel to be provided to the internal combustion engine 3. The second fuel tank 4b may contain a mixed fuel of gasoline and GTL naphtha.

The first fuel tank 4a is connected to a first injector 6a of the internal combustion engine 3 via a first duct 5a. A pump 7a is installed at some midpoint of the first duct 5a. Ethanol contained in the first fuel tank 4a is provided to the first injector 6a by the pump 7a.

In this case, a distributor 8 is installed at a downstream position of the pump 7a. A second duct 5b branches from the distributor 8. A reforming device 9 is installed at some midpoint of the second duct 5b so that the reforming device 9 reforms ethanol provided therein from the distributor 8 via the second duct 5b by bringing the ethanol being heated into contact with a catalyst, thereby providing diethyl ether. The second duct 5b is connected to a second injector 6b of the internal combustion engine 3 so that the diethyl ether obtained in the reforming device 9 is provided to the second injector 6b via the second duct 5b.

On the other hand, the second fuel tank 4b is connected to a third injector 6c of the internal combustion engine 3 via a third duct 5c. A pump 7b is installed at some midpoint of the third duct 5c. Liquid hydrocarbon such as gasoline, GTL naphtha or a mixed fuel of gasoline and GTL naphtha is provided to the third injector 6c by the pump 7b.

In the internal combustion engine system 1, the first to third injectors 6a, 6b and 6c are electrically connected to a fuel supply controlling device 10. The fuel supply controlling device 10 controls a mixture ratio of ethanol, diethyl ether and the liquid hydrocarbon provided to the internal combustion engine 3.

As shown in FIG. 2, the engine room 2 comprises the internal combustion engine 3; an exhaust device 11 for letting out exhaust from the internal combustion engine 3; and an intake device 12 for providing intake air to the internal combustion engine 3.

The exhaust device 11 comprises an exhaust pipe 13 connected to the internal combustion engine 3; and a first heat exchange device 14 located at some midpoint of the exhaust pipe 13 for exchanging heat between exhaust heat provided to the exhaust pipe 13 and a heating medium, thereby heating the heating medium.

On the other hand, the intake device 12 is connected to the internal combustion engine 3. The intake device 12 comprises a direct line 15 for providing intake air to the internal combustion engine 3; and a heating line 16 branching from the direct line 15 at an upstream position of the direct line 15 and merging again with the direct line 15 at a downstream position. A first flow control valve 17a is provided to the direct line 15 at a downstream position of the branch point between the direct line 15 and the heating line 16. A second flow control valve 17b is provided to the heating line 16 at an upstream position of the merging point of the direct line 15 and the heating line 16. The openings of the flow control valves 17a and 17b are adjusted by an electromagnetic control throttle device (not shown). A second heat exchange device 18 is provided at some midpoint of the heating line 16 as an intake air heating means for exchanging heat between the heating medium heated by the first heat exchange device 14 and intake air, thereby heating the intake air.

The heating medium is circulated via a heating medium circulating system 19 installed in the engine room 2. The circulating system 19 comprises from its upstream to its downstream a low pressure pump 20, a flow control valve 21, a first heat exchange device 14, a reforming device 9 and a second heat exchange device 18. The heating medium is heat-exchanged with the intake air in the second heat exchange device 18, then heat-exchanged with engine cooling water provided by an engine cooling water circulating system 23 in a third heat exchange device 22 provided at a downstream position of the second heat exchange device 18 to cool the heating medium, and then returned to the low pressure pump 20. The heating medium circulating system 19 comprises a bypass 19a branching from the circulating system 19 at the flow control valve 21 and merging with the circulating system 19 at a position between the first heat exchange device 14 and the reforming device 9. The reforming device 9 also functions as an ethanol heating means by exchanging heat between the heating medium heated by the first heat exchange device 14 and ethanol provided to the reforming device 9 via the second duct 5b, thereby heating the ethanol.

The engine cooling water circulating system 23 is composed of a first cooling water pipe 23a, a second cooling water pipe 23b, a third cooling water pipe 23c, and a fourth cooling water pipe 23d. The first cooling water pipe 23a connects the internal combustion engine 3 to an ethanol preheating device 24 installed in the second duct 5b at an upstream position of the reforming device 9, thereby providing engine cooling water heated in the internal combustion engine 3 to the ethanol preheating device 24. The second cooling water pipe 23b connects the ethanol preheating device 24 to the internal combustion engine 3, thereby providing engine cooling water cooled in the ethanol preheating device 24 to the internal combustion engine 3. The third cooling water pipe 23c connects the internal combustion engine 3 to the second heat exchange device 18 via the third heat exchange device 22, thereby exchanging heat between engine cooling water and the heating medium in the third heat exchange device 22, and further providing the heated engine cooling water to the second heat exchange device 18. The fourth cooling water pipe 23d connects the second heat exchange device 18 to the internal combustion engine 3, thereby providing engine cooling water cooled by heat-exchanging with the intake air in the second heat exchange device 18 to the internal combustion engine 3. The fourth cooling water pipe 23d is connected to the first cooling water pipe 23a.

Referring now to FIG. 3, there is described an aspect of functions of a heating medium in the internal combustion engine system 1 according to the present embodiment.

Examples of the heating medium may include mineral oils, silicone oils and the like having boiling points of 200° C. or higher. The heating medium can be well known heating mediums generally used in plants and the like, and no special heating medium is necessary.

In the heating medium circulating system 19, the heating medium is circulated by the low pressure pump 20, thereby first providing a required amount of the heating medium to the first heat exchange device 14 via the flow control valve 21 while allowing an excess of the heating medium to circumvent the first heat exchange device 14 via the bypass 19a. In the first heat exchange device 14, heat is exchanged between exhaust and the provided heating medium to heat the heating medium, and the heating medium heated is provided to the reforming device 9.

At an upstream position of the reforming device 9, a temperature sensor 25 is provided. The flow control valve 21 is feedback-controlled in response to the temperature of the heating medium detected by the temperature sensor 25 so that the temperature becomes suitable (in general, 200° C.) for reforming ethanol to diethyl ether in the reforming device 9. Thus the flow control valve 21 controls the amount of the heating medium to be provided to the first heat exchange device 14.

The reforming device 9 also functions as an ethanol heating means for heating ethanol provided via the second duct 5b, and configured so that the ethanol and the heating medium form a counter current. The heating medium provided to the reforming device 9 first heats the reforming device main body 9a, and then heats ethanol in the fourth heat exchange device 9b.

The reforming device 9 has a heat capacity roughly proportional to its weight. Therefore, when ethanol is directly heated with exhaust, the heat capacity causes temperature variation in the beginning of reforming. However, in the present embodiment, the reforming can be conducted with stability from the beginning of the reforming by first heating the reforming device 9 with the heating medium up to about a reforming temperature, and then providing ethanol to the reforming device 9. In this case, when the catalyst is configured to be surrounded by the heating medium, the temperature of the catalyst is stabilized and spatial temperature unevenness is prevented, thereby providing excellent reforming properties.

In the present embodiment, an ethanol preheating device 24 is provided on the second duct 5b at an upstream position of the reforming device 9, thereby preheating ethanol provided to the reforming device 9. As a result, the required heat capacity of the heating medium can be prevented from becoming excessive. The ethanol preheating device 24 can preheat ethanol to be provided to the reforming device 9 up to about 80° C. by providing engine cooling water heated in the internal combustion engine 3 via the first cooling water pipe 23a.

The heating medium drained from the reforming device 9 is subsequently provided to the second heat exchange device 18, and heat-exchanged with intake air, thereby heating the intake air. The heating medium having a considerable quantity of heat even after heating the intake air is subsequently provided to the third heat exchange device 22, thereby heat-exchanging with engine cooling water provided to the third heat exchange device 22 via the third cooling water pipe 23c. As a result, the heating medium is cooled to about 80° C. Thus cooled heating medium is returned to the low pressure pump 20.

The intake air provided to the second heat exchange device 18 may be preheated by heat-exchanging with engine cooling water provided via the third cooling water pipe 23c before the intake air is heated by heat exchanging with the heating medium. In this case, the engine cooling water provided via the third cooling water pipe 23c is heated in the internal combustion engine 3 and provided to the third heat exchange device 22 as shown in FIG. 2.

The engine cooling water provided via the third cooling water pipe 23c is provided to the third heat exchange device 22, heated by heat-exchanging with the heating medium, and drained to the fourth cooling water pipe 23d. In this case, by providing a heater core 26 at some midpoint of the fourth cooling water pipe 23d, the heater core 26 can be heated with the engine cooling water, whereby a heater can be used at an early stage. Alternatively, warming up can be conducted with the engine cooling water heated in the third heat exchange device 22.

The heating medium circulating system 19 is composed of only control systems and heat exchanging systems, and thus pressure loss is small and the system 19 does not require high pressure. Therefore, the low pressure pump 20 can be used for circulating the heating medium.

The heating medium is required to have a flow rate so that temperature control stability can be maintained for reforming ethanol to diethyl ether in the reforming device 9. However, the amount of the ethanol is small, and thus the flow rate of the heating medium is not necessarily very high. For example, a flow rate of several liters per minute meets the requirement. Therefore, a small pump is sufficient as the low pressure pump 20, and thus its electrical power consumption is as small as several tens of watts at the largest.

The heating medium passing through the low pressure pump 20 has a temperature of about 80° C. by being cooled in the third heat exchange device 22 as described above. Therefore, the low pressure pump 20 requires some heat resistance but does not require a special heat resisting means.

Use of the heating medium provides high control stability when compared with heating ethanol directly with exhaust because the heating medium has a higher flow rate than the ethanol, has a higher heat capacity and brings about less influence by heat radiation, and the heating medium does not boil during heating.

In the present embodiment, the flow control valve 21 is used for distributing the heating medium to the first heat exchange device 14 and the bypass 19a.

Alternatively, instead of the flow control valve 21, a thermo valve such as a bimetal type may be used. Use of such a thermo valve simplifies the device configuration because of not requiring power supply or a control circuit.

According to the internal combustion engine system 1 of the present embodiment, ethanol is heated by using a heating medium heated by heat-exchanging with exhaust as mentioned above, thereby easily assuring desired reforming properties in the reforming device 9. As a result, by controlling a mixture ratio of ethanol, diethyl ether and the liquid hydrocarbon, ignition properties of a fuel can be changed continuously, thereby controlling the ignition timing precisely during a homogeneous charge compression ignition operation.

In addition, according to the internal combustion engine system 1 of the present embodiment, intake air is heated by using a heating medium heated by heat-exchanging with exhaust as mentioned above, thereby controlling the ignition timing precisely and effectively during a homogeneous charge compression ignition operation.

The internal combustion engine system 1 of the present embodiment comprises both an ethanol heating means (the reforming device 9 (the fourth heat exchange device 9b)) and an intake air heating means (the second heat exchange device 18) that use a heating medium heated by heat-exchanging with exhaust as mentioned above. However, the internal combustion engine system 1 may comprise only the ethanol heating means or only the intake air heating means. It should be noted that in the case of comprising only the intake air heating means, the internal combustion engine system 1 requires a means for heating ethanol provided to the reforming device 9 with a heat source other than the heating medium.

Referring now to FIG. 4, there is described another aspect of functions of a heating medium in the internal combustion engine system 1 according to the present embodiment.

As for the configuration shown in FIG. 4, a heating medium circulating system 19 comprises a control valve 27 at an upstream position of the reforming device 9; and an adiabatic storage container 29 connected to a duct 28a branched at the control valve 27 in which the adiabatic storage container 29 is connected to the heating medium circulating system 19 at a downstream position of the control valve 27 via a duct 28b. The heating medium circulating system 19 further comprises a temperature sensor 30a for detecting the temperature of a heating medium at an upstream position of the control valve 27; and a temperature sensor 30b in the adiabatic storage container 29 for detecting a temperature of the adiabatic storage container 29. Both of the temperature sensors 30a and 30b are electrically connected to the control valve 27 and output the detected temperatures to the control valve 27.

The heating medium circulating system 19 further comprises an absorption air conditioning system regenerator 31 at a downstream position of the reforming device 9. Connected ducts to the absorption air conditioning system regenerator 31 are a water-lithium bromide duct 32a for providing lithium bromide which has absorbed water from an absorption air conditioning system not shown to the regenerator 31; a drainage duct 32b for draining water obtained by evaporating the lithium bromide which has absorbed water in the absorption air conditioning system regenerator 31; and a lithium bromide duct 32c for providing again lithium bromide regenerated by the evaporation to the absorption air conditioning system.

Except the above configuration, the configuration shown in FIG. 4 is the same as that of FIG. 3. Therefore, the same reference numerals are assigned to the same configuration and explanations thereof are omitted. In FIG. 4, the ethanol preheating device 24, the temperature sensor 25 and the heater core 26 are omitted.

In the configuration shown in FIG. 4, the same heating medium as with FIG. 3 is circulated in the heating medium circulating system 19 with the low pressure pump 20, and heated with the first heat exchange device 14 as with FIG. 3. The heating medium heated in the first heat exchange device 14 heats ethanol in the reforming device 9 as with FIG. 3. Subsequently, the heating medium heats intake air of the internal combustion engine 3 in the second heat exchange device 18 and then heat-exchanges with engine cooling water in the third heat exchange device 22, whereby the heating medium is cooled to about 80° C. Thus cooled heating medium is returned to the low pressure pump 20 as mentioned above.

By the way, when the internal combustion engine 3 is halted, the heating medium is not heated anymore in the first heat exchange device 14 and is cooled. Once the heating medium is cooled, it takes time to heat again the heating medium. Therefore, when the internal combustion engine 3 is operated again, it takes time until the ethanol and the intake air can be heated.

Then in configuration shown in FIG. 4, when the internal combustion engine 3 is halted, a control valve 27 detects the halt of the internal combustion engine 3, and introduces the heating medium to an adiabatic storage container 29 via a duct 28a, whereby the heating medium is contained in the adiabatic storage container 29. Thus the heating medium is stored at the temperature heated in the first heat exchange device 14. On the other hand, on detecting the operation of the internal combustion engine 3, the adiabatic storage container 29 provides the stored heating medium to the heating medium circulating system 19 via the duct 28b, thereby circulating the heating medium. As a result, a heating medium with high temperature can be circulated in the heat circulating system from the start of the operation, whereby the ethanol or the intake air can be heated in an extremely short period.

In this case, the control valve 27 generally closes the duct 28a, and thus the heating medium is not introduced to the adiabatic storage container 29. The duct 28b comprises a check valve not shown so that the heating medium circulating in the heating medium circulating system 19 does not flow from the duct 28b into the adiabatic storage container 29.

By the way, during an operation of the internal combustion engine 3 and the heating medium circulating in the heating medium circulating system 19, the temperature T1 of the heating medium may become lower than the temperature T2 in the adiabatic storage container 29 depending on the condition. Therefore, in the configuration shown in FIG. 4, the temperature T1 of the heating medium is detected by a temperature sensor 30a provided in the heating medium circulating system 19 at an upstream position of the control valve 27, and also the temperature T2 in the adiabatic storage container 29 is detected by a temperature sensor 30b provided in the adiabatic storage container 29. Then the control valve 27 compares the temperatures detected by the temperature sensors 30a and 30b. Only when the temperature T2 in the adiabatic storage container 29 is higher than the temperature T1 of the heating medium (T2>T1), the heating medium is flowed into the adiabatic storage container 29.

In this case, the heating medium is heated by being introduced to the adiabatic storage container 29 from the control valve 27 via the duct 28a, subsequently being passed through the adiabatic storage container 29 and being returned to the heating medium circulating system 19 from the duct 28b.

Therefore, the heating medium is heated by the first heat exchange device 14 and also by the adiabatic storage container 29. As a result, temperature control range during an operation of the internal combustion engine 3 can be increased.

In the configuration of FIG. 4, an absorption air conditioning system regenerator 31 may be provided at some midpoint of the heating medium circulating system 19, for example, at a position between the reforming device 9 and the second heat exchange device 18. For example, an absorption air conditioning system (not shown) uses water as a coolant and lithium bromide as an absorbing solution. Water absorbed by the lithium bromide is provided to the absorption air conditioning system regenerator 31 via a water-lithium bromide duct 32a. The absorption air conditioning system regenerator 31 heats and evaporates lithium bromide which has absorbed water by using the heating medium, thereby separating the lithium bromide which has absorbed water into water and lithium bromide. The separated water is drained from a drainage duct 32b. The lithium bromide separated by the evaporation and regenerated is provided again to the absorption air conditioning system via a lithium bromide duct 32c.

In FIG. 5, there is shown another internal combustion engine system 41 according to the present embodiment. The internal combustion engine system 41 has an identical configuration with the internal combustion engine system 1 shown in FIG. 1 except that the system 41 comprises a fuel tank 42 containing a mixed fuel comprising ethanol and at least one of gasoline and GTL naphtha; and a separator 43 that separates the mixed fuel provided from the fuel tank 42 into an ethanol-water mixture and liquid hydrocarbon such as gasoline, GTL naphtha or a mixed fuel of gasoline and GTL naphtha by adding water to the mixed fuel, and the first duct 5a and the third duct 5c are connected to the separator 43.

In the internal combustion engine system 41, the ethanol-water mixture obtained in the separator 43 is provided to the first injector 6a of the internal combustion engine 3 via the first duct 5a. The reforming device 9 brings the ethanol-water mixture provided from the distributor 8 via the second duct 5b into contact with a catalyst while heating the ethanol-water mixture, thereby reforming the mixture to a diethyl ether-water mixture. The diethyl ether-water mixture obtained in the reforming device 9 is provided to the second injector 6b via the second duct 5b.

Subsequently, the fuel supply controlling device 10 controls a mixture ratio of the ethanol-water mixture, the diethyl ether-water mixture and the liquid hydrocarbon to be provided to the internal combustion engine 3.

The functions of a heating medium in the internal combustion engine system 41 are identical with those in the internal combustion engine system 1 except that the ethanol is replaced with the ethanol-water mixture and the diethyl ether is replaced with the diethyl ether-water mixture.

What is claimed is:

1. An internal combustion engine system switchable between a spark ignition operation and a homogeneous charge compression ignition operation, comprising:
    a first fuel tank containing ethanol;
    a second fuel tank containing at least one of gasoline and GTL naphtha;
    a reforming means for reforming a portion of ethanol provided from the first fuel tank to an internal combustion engine by heating and bringing the ethanol into contact with a catalyst to obtain diethyl ether;
    a heat exchange means for exchanging heat between exhaust heat of the internal combustion engine and a heating medium to heat the heating medium;
    an ethanol heating means for heating ethanol provided to the reforming means with the heating medium heated by the heat exchange means; and
    a fuel supply controlling means for controlling a mixture ratio of ethanol provided from the first fuel tank to the internal combustion engine, at least one of gasoline and GTL naphtha provided from the second fuel tank to the internal combustion engine, and diethyl ether provided from the reforming means to the internal combustion engine.

2. The internal combustion engine system according to claim 1, wherein the spark ignition operation is carried out during high engine load conditions, while the homogeneous charge compression ignition operation is carried out during low engine load conditions.

3. The internal combustion engine system according to claim 1, further comprising an adiabatic storage container for containing the heating medium heated by the heat exchange means and storing the heating medium under adiabatic conditions during a halt of the internal combustion engine.

4. The internal combustion engine system according to claim 3, further comprising:
    a first thermal detecting means for detecting a temperature of the adiabatic storage container;
    a second thermal detecting means for detecting a temperature of the heating medium heated by the heat exchange means; and
    a flow controlling means for flowing the heating medium to the adiabatic storage container only when the temperature detected by the first thermal detecting means is higher than the temperature detected by the second thermal detecting means during an operation of the internal combustion engine.

5. An internal combustion engine system switchable between a spark ignition operation and a homogeneous charge compression ignition operation, comprising:
    a first fuel tank containing ethanol;
    a second fuel tank containing at least one of gasoline and GTL naphtha;
    a reforming means for reforming a portion of ethanol provided from the first fuel tank to an internal combustion engine by heating and bringing the ethanol into contact with a catalyst to obtain diethyl ether;
    a heat exchange means for exchanging heat between exhaust heat of the internal combustion engine and a heating medium to heat the heating medium;
    an intake air heating means for heating intake air of the internal combustion engine with the heating medium heated by the heat exchange means; and
    a fuel supply controlling means for controlling a mixture ratio of ethanol provided from the first fuel tank to the internal combustion engine, at least one of gasoline and GTL naphtha provided from the second fuel tank to the internal combustion engine, and diethyl ether provided from the reforming means to the internal combustion engine.

6. The internal combustion engine system according to claim 5, further comprising an ethanol heating means for heating ethanol provided to the reforming means with the heating medium heated by the heat exchange means.

7. The internal combustion engine system according to claim 5, wherein the spark ignition operation is carried out during high engine load conditions, while the homogeneous charge compression ignition operation is carried out during low engine load conditions.

8. The internal combustion engine system according to claim 5, further comprising an adiabatic storage container for containing the heating medium heated by the heat exchange means and storing the heating medium under adiabatic conditions during a halt of the internal combustion engine.

9. The internal combustion engine system according to claim 8, further comprising:
- a first thermal detecting means for detecting a temperature of the adiabatic storage container;
- a second thermal detecting means for detecting a temperature of the heating medium heated by the heat exchange means; and
- a flow controlling means for flowing the heating medium to the adiabatic storage container only when the temperature detected by the first thermal detecting means is higher than the temperature detected by the second thermal detecting means during an operation of the internal combustion engine.

10. An internal combustion engine system switchable between a spark ignition operation and a homogeneous charge compression ignition operation, comprising:
- a fuel tank containing a mixed fuel comprising ethanol and at least one of gasoline and GTL naphtha;
- a separating means for separating the mixed fuel provided from the fuel tank into the at least one of gasoline and GTL naphtha and an ethanol-water mixture by adding water to the mixed fuel;
- a reforming means for reforming a portion of the ethanol-water mixture provided from the separating means to the fuel tank by heating and bringing the ethanol-water mixture into contact with a catalyst to obtain a diethyl ether-water mixture;
- a heat exchange means for exchanging heat between exhaust heat of the internal combustion engine and a heating medium to heat the heating medium;
- an ethanol heating means for heating the ethanol-water mixture provided to the reforming means with the heating medium heated by the heat exchange means; and
- a fuel supply controlling means for controlling a mixture ratio of ethanol and at least one of gasoline and GTL naphtha provided from the separating means to the internal combustion engine, and the diethyl ether-water mixture provided from the reforming means to the internal combustion engine.

11. The internal combustion engine system according to claim 10, wherein the spark ignition operation is carried out during high engine load conditions, while the homogeneous charge compression ignition operation is carried out during low engine load conditions.

12. The internal combustion engine system according to claim 10, further comprising an adiabatic storage container for containing the heating medium heated by the heat exchange means and storing the heating medium under adiabatic conditions during a halt of the internal combustion engine.

13. The internal combustion engine system according to claim 12, further comprising:
- a first thermal detecting means for detecting a temperature of the adiabatic storage container;
- a second thermal detecting means for detecting a temperature of the heating medium heated by the heat exchange means; and
- a flow controlling means for flowing the heating medium to the adiabatic storage container only when the temperature detected by the first thermal detecting means is higher than the temperature detected by the second thermal detecting means during an operation of the internal combustion engine.

14. An internal combustion engine system switchable between a spark ignition operation and a homogeneous charge compression ignition operation, comprising:
- a fuel tank containing a mixed fuel comprising ethanol and at least one of gasoline and GTL naphtha;
- a separating means for separating the mixed fuel provided from the fuel tank into the at least one of gasoline and GTL naphtha and an ethanol-water mixture by adding water to the mixed fuel;
- a reforming means for reforming a portion of the ethanol-water mixture provided from the separating means to the fuel tank by heating and bringing the ethanol-water mixture into contact with a catalyst to obtain a diethyl ether-water mixture;
- a heat exchange means for exchanging heat between exhaust heat of the internal combustion engine and a heating medium to heat the heating medium;
- an intake air heating means for heating intake air of the internal combustion engine with the heating medium heated by the heat exchange means; and
- a fuel supply controlling means for controlling a mixture ratio of ethanol and at least one of gasoline and GTL naphtha provided from the separating means to the internal combustion engine, and the diethyl ether-water mixture provided from the reforming means to the internal combustion engine.

15. The internal combustion engine system according to claim 14, further comprising an ethanol heating means for heating the ethanol-water mixture provided to the reforming means with the heating medium heated by the heat exchange means.

16. The internal combustion engine system according to claim 14, wherein the spark ignition operation is carried out during high engine load conditions, while the homogeneous charge compression ignition operation is carried out during low engine load conditions.

17. The internal combustion engine system according to claim 14, further comprising an adiabatic storage container for containing the heating medium heated by the heat exchange means and storing the heating medium under adiabatic conditions during a halt of the internal combustion engine.

18. The internal combustion engine system according to claim 17, further comprising:
- a first thermal detecting means for detecting a temperature of the adiabatic storage container;
- a second thermal detecting means for detecting a temperature of the heating medium heated by the heat exchange means; and
- a flow controlling means for flowing the heating medium to the adiabatic storage container only when the temperature detected by the first thermal detecting means is higher than the temperature detected by the second thermal detecting means during an operation of the internal combustion engine.

* * * * *